(12) United States Patent
Kim

(10) Patent No.: US 7,009,658 B2
(45) Date of Patent: Mar. 7, 2006

(54) APPARATUS AND METHOD OF DISPLAYING VIDEO DATA IN DIGITAL TV

(75) Inventor: In Hoon Kim, Taegu-shi (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 09/907,505

(22) Filed: Jul. 18, 2001

(65) Prior Publication Data

US 2002/0036712 A1 Mar. 28, 2002

(30) Foreign Application Priority Data

Jul. 18, 2000 (KR) ............................... 2000-41043

(51) Int. Cl.
*H04N 5/445* (2006.01)

(52) U.S. Cl. .................................... 348/553

(58) Field of Classification Search ................ 348/553, 348/552, 461, 468, 569, 578; 345/467, 629; 725/70, 151; 386/52, 55, 92
See application file for complete search history.

(56) References Cited

U.S. PATENT DOCUMENTS

| | | | | |
|---|---|---|---|---|
| 5,742,353 A | * | 4/1998 | Yasuki et al. ............... | 348/578 |
| 5,822,425 A | * | 10/1998 | Ezaki et al. .................. | 386/94 |
| 5,838,383 A | * | 11/1998 | Chimoto et al. ............ | 348/553 |
| 6,094,414 A | * | 7/2000 | Taira et al. ............... | 369/275.3 |
| 6,128,432 A | * | 10/2000 | Lee ............................. | 386/70 |
| 6,181,872 B1 | * | 1/2001 | Yamane et al. ............. | 386/112 |
| 6,185,369 B1 | * | 2/2001 | Ko et al. ..................... | 386/125 |
| 6,297,797 B1 | * | 10/2001 | Takeuchi et al. ............ | 345/467 |
| 6,546,195 B1 | * | 4/2003 | Kashiwagi et al. ......... | 386/126 |
| 6,553,180 B1 | * | 4/2003 | Kikuchi et al. ............... | 386/95 |
| 6,714,216 B1 | * | 3/2004 | Abe ............................ | 715/723 |

* cited by examiner

*Primary Examiner*—Paulos M. Natnael
(74) *Attorney, Agent, or Firm*—Fleshner & Kim, LLP

(57) ABSTRACT

An apparatus and method for displaying video data on a screen in a digital television system are disclosed. Since a viewer can easily notice that he or she is watching a multi-angle digital channel according to the present invention, the viewer can conveniently select a desired picture. The method includes tuning to a channel selected by a viewer and displaying the video data depending on a total number of video IDs of the selected channel and whether a multi-angle mode is set. If a multi-angle mode is set, the apparatus decodes all sets of the received video data and display all of them in a screen at same time. Then the viewer can select a desired channel. If the multi-angle mode is not set, it displays the first encoded set of video data with a multi-angle icon. The icon indicates the current picture the viewer is watching is one of the multi-angle pictures. Similarly, he or she can easily select a desired channel by simply using the remote control device.

30 Claims, 3 Drawing Sheets

APPARATUS AND METHOD OF DISPLAYING VIDEO DATA IN DIGITAL TV

BACKGROUND OF THE INVENTION

1. Field of the Invention

The present invention relates to digital TV systems, and more particularly, to an apparatus and method of displaying video data on a screen in a digital television system.

2. Background of the Related Art

There has been a qualitative and quantitative growth in the digital TV technology field based on the fact that the technology has been shifted from the analog technique to the satellite and digital techniques. Particularly, one of the examples showing the qualitative growth is that the number of digital TV channels will be drastically increased due to the fact that a current digital TV set can handle a larger number of channels than a typical analog TV set. The TV viewers of today need more than simply knowing what channels or broadcasting stations he or she will be watching in advance in order to effectively utilize various channels being provided these days. Therefore, it is frequently being demanded that each digital TV set needs to have a guidance function to provide program information of each channel or broadcasting station to a viewer so that he or she can easily comprehend various programs and select a desired channel. This means that the technology relating such guidance function needs to be developed in response to such high demand.

The current audio and video products provide various functions in addition to few basic functions of the prior analog equipments. For example, VCR players having limited basic functions such as image recording and generating are being replaced with DVD players having various functions such as chapter, image quality, caption, and sound selections. In addition, the digital television sets supporting such functions are prevailing against others.

Another example of the various functions of the current digital TV sets is that they can select, reproduce, and display more than one series of audio and/or video data obtained by shooting the same object from a number of angles (multi-angle function). In contrast, the conventional analog TV sets can transmit/receive only one series of audio and/or video data through each high frequency channel. The multi-angle function of the present digital TV sets can be used for various TV programs including sports broadcasting and live concerts.

However, when the conventional digital TV set according to the prior art receives multi-series (multi-angle) video data from a DVD player or other, it can decode only one series of the video data previously selected. Therefore, it is difficult to determine if it is selected by a viewer.

SUMMARY OF THE INVENTION

Accordingly, the present invention is directed to an apparatus and method of displaying video data on a screen in a digital television system that substantially obviates one or more problems due to limitations and disadvantages of the related art.

An object of the present invention is to provide an apparatus and method for displaying image data in a digital TV set so that a TV viewer can easily select a desired set of image data among many sets of multi-angle video data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for displaying video data in a digital television system includes a digital signal detector for detecting digital image signals corresponding to a channel selected by a viewer; a microprocessor for generating a control signal in order to display the detected digital image signals depending on a channel number of the selected channel, a total number of video IDs, and whether a multi-angle mode is set; a demultiplxer for dividing the detected digital image signals into video, audio, and supplemental information streams based on the control signal; and an image processor for processing the video stream based on the control signal in order to generate displayable image signals.

In another aspect of the present invention, a method for displaying video data on a screen in a digital television system includes tuning to a channel desirably selected by a viewer and displaying the video data depending on a total number of video IDs of the selected channel and whether a multi-angle mode is set.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
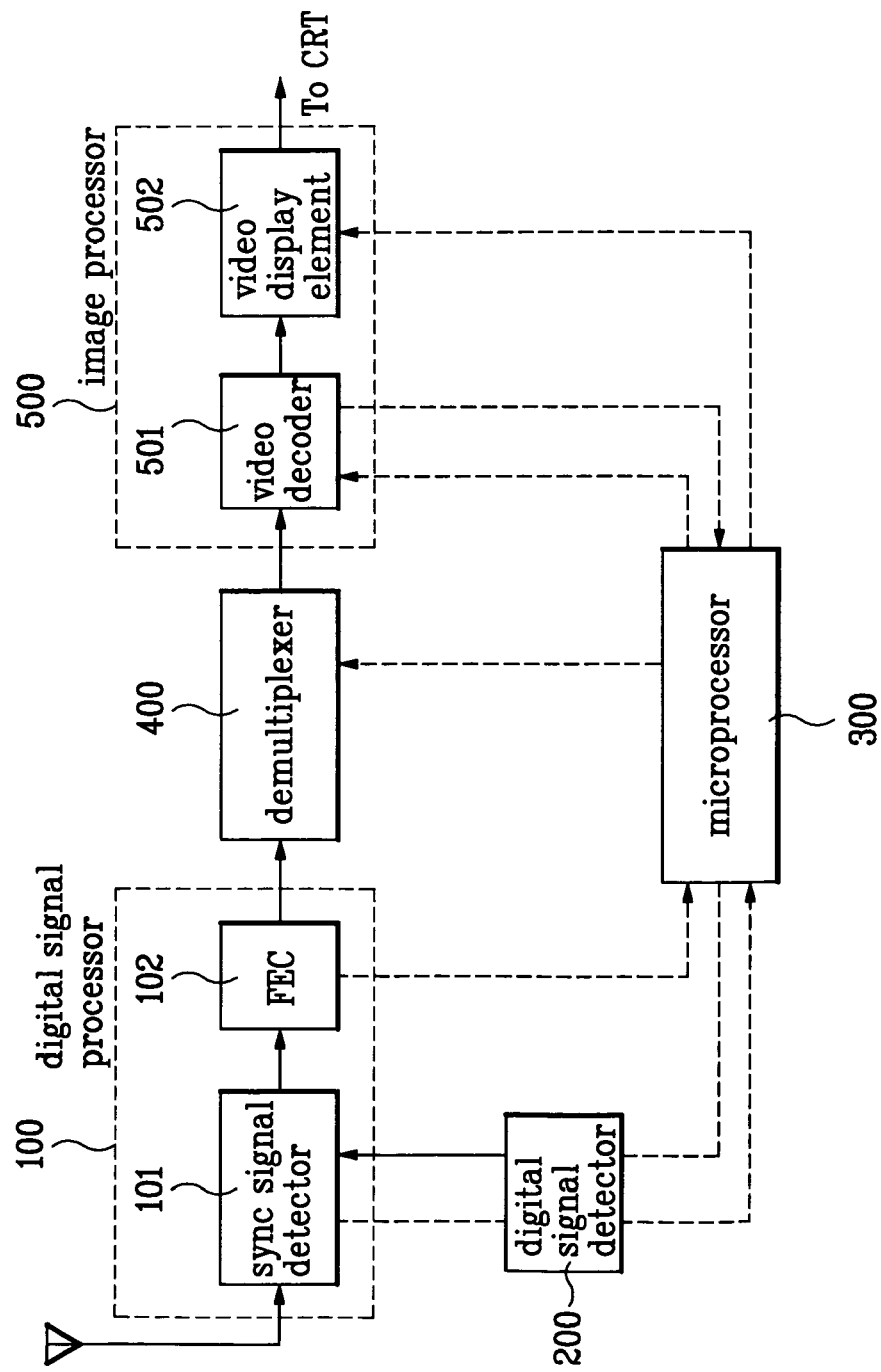
FIG. 1 is a block diagram illustrating an apparatus of displaying image data in a digital TV set according to the present invention.
Figure 2:
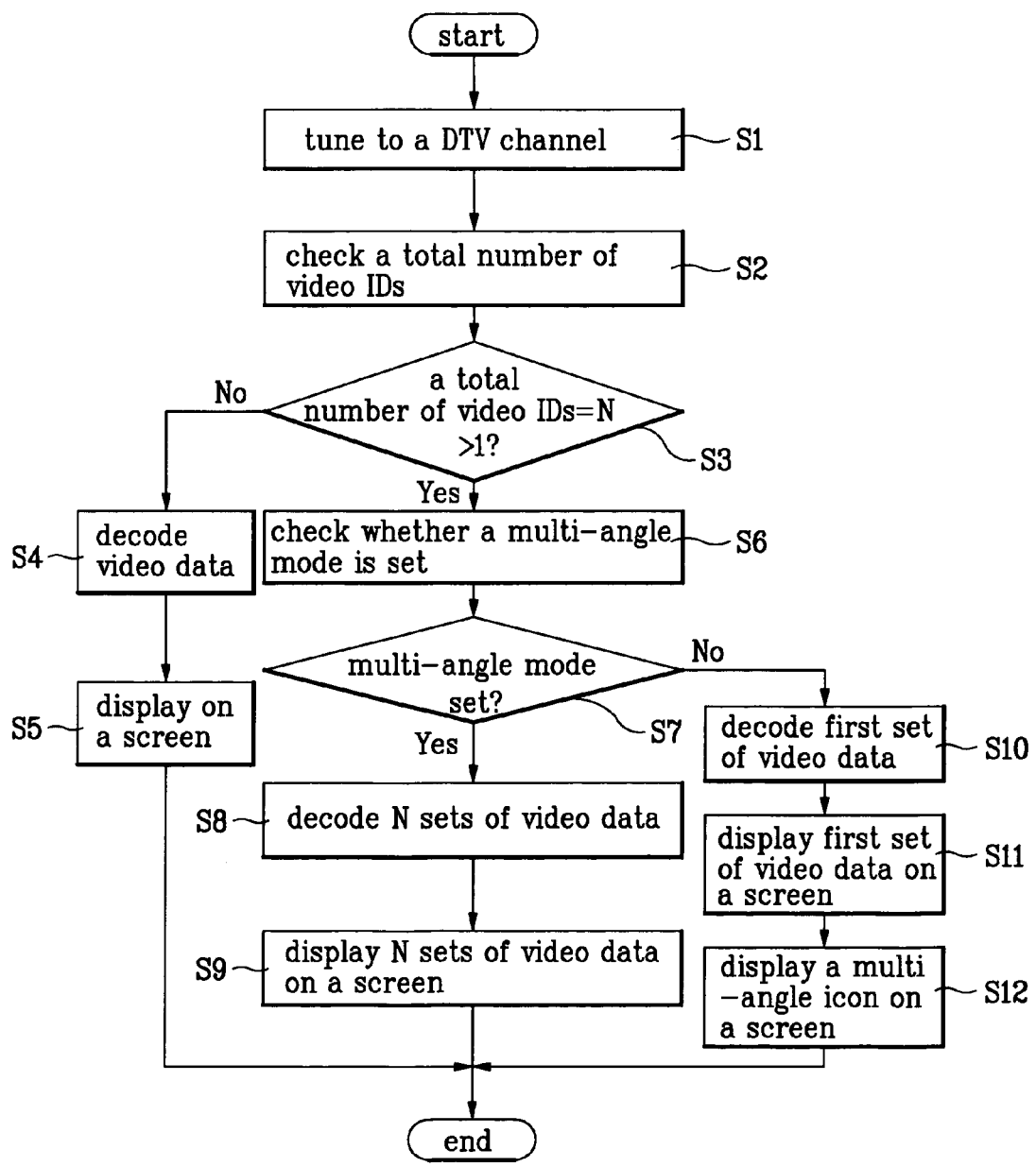
FIG. 2 is a flow chart illustrating a method of displaying image data in a digital TV set according to the present invention.

FIG. 1 is a block diagram illustrating an apparatus for displaying video data on a screen in a digital TV system according to the present invention, and FIG. 2 is a flow chart illustrating a method of displaying video data on a screen in a digital television system according to the present invention. As shown in FIG. 1, the apparatus according to the present invention includes a digital signal processor 100 for detecting a digital TV sync signal and for correcting errors; a digital signal detector 200 for detecting digital signals from the image signals received through the digital signal processor 100; a microprocessor 300 for generating a control signal in order to tune a selected channel if any digital signals are detected by the digital signal detector 200; a demultiplexer 400 for receiving digital signals from the digital signal processor 100 and dividing them into each of video, audio, and supplemental information streams; an image processor 500 for converting the video stream received from the demultiplexer 400 into a displayable image signal.

The digital signal processor 100 includes a sync signal detector 101 for detecting a sync signal of the input digital signal received through an antenna; and a forward error correction (FEC) element 102 for correcting the errors if a sync signal is detected by the sync signal detector 101.

The image processor 500 includes a video decoder 501 for decoding the video signal divided in the demultiplexer 400; and a video display element 502 for receiving the decoded video signal from the video decoder 501 and displaying the decoded signal on a screen when they are ready to be displayed.

Reference will now be made in detail to the operation of the apparatus of displaying video data in a digital television system according to the present invention, examples of which are illustrated in the accompanying drawings.

First, when the digital sync detector 101 receives a digital image signal through an antenna, the microprocessor 300 generates an appropriate control signal to the digital sync detector 200 in order to select a desired radio frequency (RF) channel. When the digital signals of the selected channel are received according to the control signal, the sync signal detector 101 checks whether there is a sync signal included in the received signals. If it is determined that it exists, the FEC element 102 performs appropriate error corrections and outputs the signals to the microprocessor 300 or the demultiplexer 400 depending on whether a digital stream exists in the error-corrected signals.

In other words, if a digital stream exists in the signals corrected in the FEC element 102, the FEC element 102 outputs the signals to the demultiplexer 400 in order to divide the signals into each of video, audio, and supplemental streams as desired by the microprocessor 300. Otherwise, the FEC element 102 notifies the microprocessor 300 that there is no digital stream included.

Furthermore, the video decoder 501 decodes the video stream divided in the demultiplexer 400, and the video display element 502 receives the decoded video stream. Finally, the video display element 502 outputs the decoded signals when they are ready to be displayed.

Video signals received through the digital TV channel included in an RF channel get displayed using the method shown above, and each digital TV channel is described using the following tables as follows.

TABLE 1

| 48RF | |
|---|---|
| Channel number | Video ID |
| 13-3 | 0x31 |
| 13-4 | 0x32 |
| 13-5 | 0x33 |
| 13-6 | 0x34 |

As shown in Table 1, when there are more than one channel in an RF channel, each independent channel can be tuned by using up/down buttons of the remote control.

TABLE 2

| 35RF | |
|---|---|
| Channel number | Video ID |
| 21-3 | 0x31 |
| | 0x32 |
| | 0x33 |
| | 0x34 |

As shown in Table 2, when an RF channel has only one channel number having more than one video ID, it can be used as a multi-angle video channel.

Reference will now be made in detail to a method of displaying video data in a digital television system according to the present invention, example of which is illustrated in FIG. 2. First, a viewer tunes to a desired channel (S1), and the digital television system checks the number of video IDs of the selected channel (S2). Thereafter, it determines whether there is more than one video ID (S3) included. If there is only one video ID, it decodes the received video data and displays the decoded data on a screen (S4 and S5). On the other hand, if there are more than one video ID, it checks and determines whether a multi-angle mode is set (S6 and S7). If a multi-angle mode is set, it decodes each set of video data into a multi-video stream and displays the all sets of video data on sub-screens of a screen, wherein the number of sub-screens is equal to the number of the video IDs.

On the other hand, if a multi-angle mode is not set, it decodes the first received video data (S10) and displays the decoded data on a screen with an icon indicative of a multi-angle picture, a number of total multi-angle pictures, and a picture number of a current multi-angle picture on the screen (S11 and S12). Next, the viewer can select a desired picture among the multi-angle pictures by pressing the multi-angle picture selection button of the remote control device. In other words, it decodes all the multi-angle video data at same time, displays the first video data initially, and enables the viewer to select a desired picture by using the arrow buttons of the remote control device.

Figure 3A:
FIG. 3A illustrates a TV screen showing a first example when a method of displaying image data according to the present invention is used.
Figure 3B:
FIG. 3B illustrates a TV screen showing a second example when a method of displaying image data according to the present invention is used.

Reference will now be made in detail to examples of the method according to the present invention, which are illustrated in FIG. 3A and FIG. 3B. FIG. 3A illustrates a TV screen displaying video data of a channel having more than one video ID when a single mode is selected by a viewer. The system decodes the only one video stream and displays the decoded data and an icon indicative of a multi-angle picture. The icon shows the total number of the multi-angle pictures and the number of the current picture being displayed. Therefore, the viewer can select a desired picture by pressing the multi-angle picture selection button.

On the other hand, FIG. 3B illustrates a TV screen displaying the image data after all the multi-angle image data are decoded simultaneously. The first set of video data is selected as a default, and it enables the viewer to select a desired picture by using arrow buttons of the remote control device.

The apparatus and method of displaying image data in a digital TV set of the present invention have following advantages. First, when multi-angle image data are being received, the viewer can become aware of the multi-angle picture by the icon. Therefore, he or she can select a desired picture more conveniently. Second, the various functions of the digital TV set can be easily used by displaying the multi-angle pictures on the screen at same time.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for displaying video data in a digital television system, the apparatus comprising:
   a digital signal detector for detecting digital image signals corresponding to a channel selected by a viewer;
   a microprocessor for generating a control signal in order to display said detected digital image signals depending on a channel number of said selected channel, a total number of video IDs, and whether a multi-angle mode is set;
   a demultiplexer for dividing said detected digital image signals into video, audio, and supplemental information streams based on said control signal;
   an image processor for processing said video stream based on said control signal in order to generate displayable image signals, the displayable image signals including information to display video data based on whether the multi-angle mode is set when the total number of video IDs is larger than one, and the displayable image signals including information to display video data when the total number of video IDs is equal to one.

2. A method for displaying video data on a screen in a digital television system, the method comprising the steps of:
   (a) tuning to a channel desirably selected by a viewer; and
   (b) displaying said video data depending on a total number of video IDs of said selected channel and whether a multi-angle mode is set, wherein displaying the video data includes:
   displaying said video data depending on whether said multi-angle mode is set when a determined total number of said video IDs is larger than one; and
   decoding said video data and displaying said decoded video data when said determined total number of said video IDs is equal to one.

3. The method of claim 2, wherein said step b) comprises:
   (b1) determining said total number of said video IDs of said selected channel; and
   (b2) displaying said video data depending on said determined total number of said video IDs.

4. The method of claim 2, further comprising the steps of:
   decoding all sets of said video data into a multi-video stream if said multi-angle mode is set; and
   dividing said decoded multi-video stream by said determined number of said video IDs and displaying said divided multi-video stream on said screen.

5. The method of claim 2, further comprising the steps of:
   decoding a first set of said video data unless said multi-angle mode is set;
   displaying said decoded first set of video data on said screen; and
   displaying a multi-angle icon on said screen.

6. The method of claim 5, wherein said multi-angle icon indicates that a picture currently being displayed on said screen is one of multi-angle pictures.

7. The method of claim 5, wherein said multi-angle icon includes a total number of multi-angle pictures received.

8. The method of claim 7, wherein said multi-angle icon further includes a picture number of a current picture being displayed.

9. A method of displaying video data on a screen in a digital television system, the method comprising the steps of:
   tuning to a channel selected by a viewer;
   determining whether a total number of video IDs of said selected channel is larger than one;
   decoding all sets of said video data received into a multi-video stream and displaying all sets of said video data on said screen if said total number of video IDs is larger than one and a multi-angle mode is set; and
   decoding sets of said video data progressively and displaying a first decoded set of said video data if said total number of video IDs is larger than one and a multi-angle mode is not set.

10. A method of displaying video data on a screen in a digital television system, the method comprising:
    receiving a plurality of video data sets representing a series of multi-angle pictures through a single channel;
    displaying one of the series of multi-angle pictures on an entire portion of the screen by decoding a corresponding video data set received;
    displaying a first multi-angle icon on the screen for indicating that the displayed picture is one of the series of multi-angle pictures; and
    displaying all of the series of the multi-angle pictures on divided portions of the screen when a multi-angle picture function is activated.

11. The method of claim 10, wherein the single channel is a digital television (TV) channel included in a radio frequency (RF) channel.

12. The method of claim 10, wherein the single channel is a multi-angle video channel.

13. The method of claim 10, wherein the first multi-angle icon includes a total number of the series of multi-angle pictures received.

14. The method of claim 13, wherein the first multi-angle icon further includes a picture number representative of the displayed picture.

15. The method of claim 10, further comprising:
    decoding all the plurality of video data sets if a viewer activates the multi-angle picture function; and
    displaying a second multi-angle icon on each divided screen portion for indicating that each displayed picture is one of the series of multi-angle pictures.

16. The method of claim 15, wherein the second multi-angle icon includes a total number of the series of multi-angle pictures received.

17. The method of claim 16, wherein the second multi-angle icon further includes a picture number representative of each displayed picture.

18. The method of claim 10, wherein each of the displayed series of the multi-angle pictures is selectable.

19. The method of claim 18, further comprising:
    selecting one of the displayed series of the multi-angle pictures;
    displaying the selected multi-angle picture on the entire portion of the screen; and
    displaying a second multi-angle icon on the screen for indicating that the displayed picture is one of the series of multi-angle pictures.

20. The method of claim 19, wherein the second multi-angle icon includes a total number of the series of multi-angle pictures and a picture number representative of the displayed picture.

21. An apparatus for displaying video data in a digital television system, the apparatus comprising:
- a digital signal detector to detect digital image signals corresponding to a channel selected by a viewer;
- a processor to generate a control signal to display said detected digital image signals depending on a channel number of said selected channel, a total number of video IDs, and whether a multi-angle mode is set;
- a demultiplexer to divide said detected digital image signals into video, audio and supplemental information streams based on said control signal; and
- an image processor to process said video stream based on said control signal to generate displayable image signals, wherein said multi-angle mode comprises a mode in which to simultaneously display a plurality of sub-screens on a display.

22. The apparatus of claim 21, wherein a number of the plurality of sub-screens corresponds to the total number of video IDs.

23. The apparatus of claim 1, further comprising a display to display video data based on whether the multi-angle mode is set and if the total number of video IDs is greater than 1.

24. The apparatus of claim 23, wherein said display simultaneously displays a plurality of sub-screens if the multi-angle mode is set and the total number of video IDs is greater than 1.

25. A method to display video data on a screen in a digital television system, the method comprising:
- tuning to a channel selected by a viewer; and
- displaying said video data depending on a total number of video IDs of said selected channel and whether a multi-angle mode is set, wherein said multi-angle mode comprises a mode in which to simultaneously display a plurality of sub-screens on the screen.

26. The method of claim 25, wherein a number of the plurality of sub-screens corresponds to the total number of video IDs.

27. The method of claim 2, wherein displaying said video data comprises displaying video data based on whether the multi-angle mode is set and if the total number of video IDs is greater than 1.

28. The method of claim 27, wherein displaying said video data further comprises simultaneously displaying a plurality of sub-screens if the multi-angle mode is set and the total number of video IDs is greater than 1.

29. The method of claim 2, further comprising displaying a multi-angle icon indicative of a picture being currently displayed.

30. The method of claim 29, wherein the multi-angle icon includes a total number of a series of received multi-angle pictures.

* * * * *